United States Patent
Yang et al.

(10) Patent No.: US 10,069,600 B2
(45) Date of Patent: Sep. 4, 2018

(54) USER APPARATUS INCLUDING A DEDICATED RF CHAIN FOR PROSE AND TRANSMITTING AND RECEIVING METHOD

(71) Applicant: LG ELECTRONICS INC., Seoul (KR)

(72) Inventors: Yoonoh Yang, Seoul (KR); Sangwook Lee, Seoul (KR); Suhwan Lim, Seoul (KR); Hanbyul Seo, Seoul (KR); Seungmin Lee, Seoul (KR); Manyoung Jung, Seoul (KR); Jinyup Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 113 days.

(21) Appl. No.: 15/154,875

(22) Filed: May 13, 2016

(65) Prior Publication Data

US 2016/0338055 A1  Nov. 17, 2016

Related U.S. Application Data

(60) Provisional application No. 62/161,898, filed on May 15, 2015.

(30) Foreign Application Priority Data

May 13, 2016 (KR) .................. 10-2016-0058535

(51) Int. Cl.
*H04L 1/16* (2006.01)
*H04W 8/00* (2009.01)
(Continued)

(52) U.S. Cl.
CPC .......... *H04L 1/1614* (2013.01); *H04L 1/1893* (2013.01); *H04L 5/0053* (2013.01); (Continued)

(58) Field of Classification Search
CPC ......... H04W 52/0209; H04W 52/0212; H04W 52/0216; H04W 52/0222; H04W 52/0261; H04W 52/0274; H04W 52/028
See application file for complete search history.

(56) References Cited

U.S. PATENT DOCUMENTS

2015/0282108 A1* 10/2015 Kiss ..................... H04W 8/005
455/435.1
2016/0366677 A1* 12/2016 Fujishiro ........... H04W 72/0406

\* cited by examiner

*Primary Examiner* — Pao Sinkantarakorn
(74) *Attorney, Agent, or Firm* — Lee Hong Degerman Kang Waimey

(57) ABSTRACT

There is provided a transmitting/receiving method performed by a user equipment (UE) including a dedicated radio frequency (RF) chain for a proximity service (ProSe). The method may comprise: receiving configuration information for a discovery resource pool, the discovery resource pool including a bitmap representing a subframe used for a discovery signal and information representing the number of times when the bitmap is repeated; turning on the dedicated RF chain based on a subframe corresponding to a first bit 1 in a bit string enumerated by the bitmap and the number of repetition times; turning on the dedicated RF chain and thereafter, transmitting/receiving a signal to/from an adjacent UE; and turning off the dedicated RF chain based on a subframe corresponding to a last bit 1 in the bit string.

8 Claims, 20 Drawing Sheets

(51) Int. Cl.
*H04W 52/00* (2009.01)
*H04L 1/18* (2006.01)
*H04W 76/14* (2018.01)
*H04L 5/00* (2006.01)
*H04L 5/14* (2006.01)

(52) U.S. Cl.
CPC .......... *H04L 5/0069* (2013.01); *H04L 5/0094* (2013.01); *H04W 8/005* (2013.01); *H04W 52/00* (2013.01); *H04W 76/14* (2018.02); *H04L 5/001* (2013.01); *H04L 5/14* (2013.01); *Y02D 70/20* (2018.01)

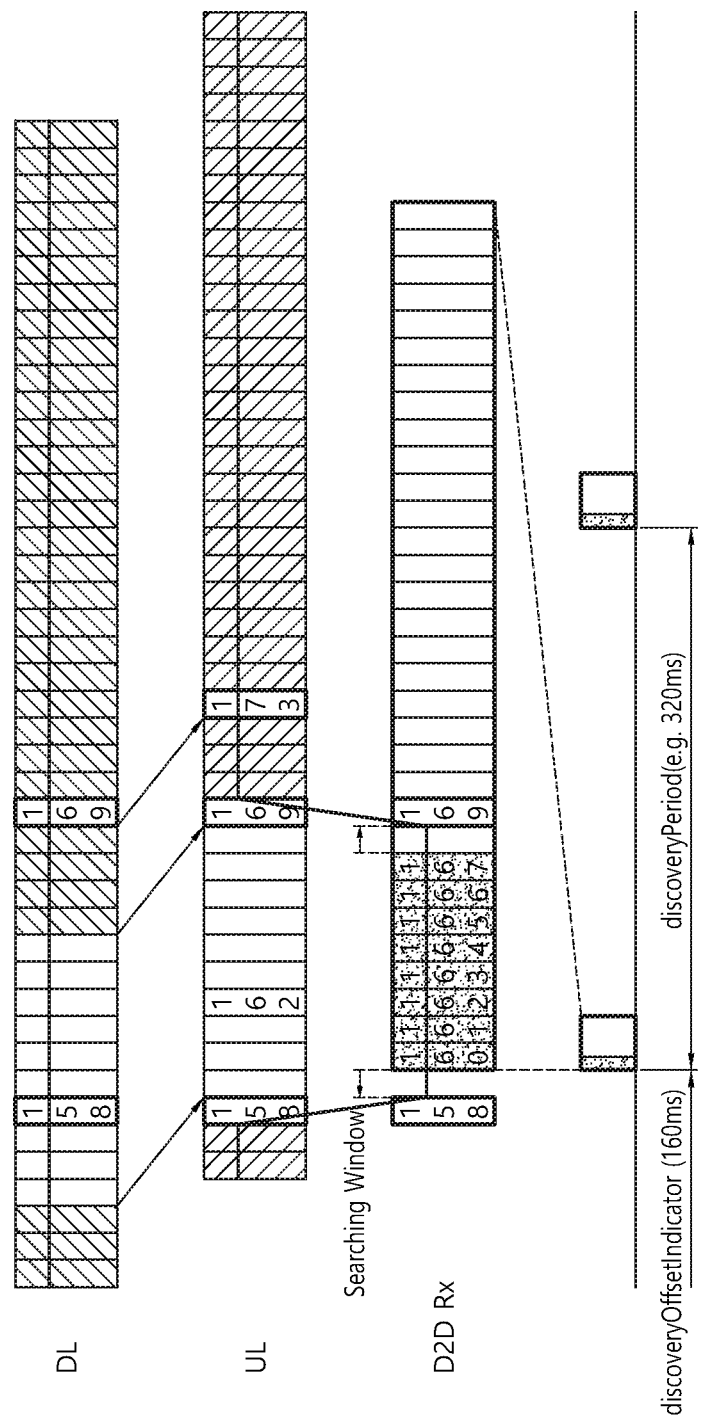

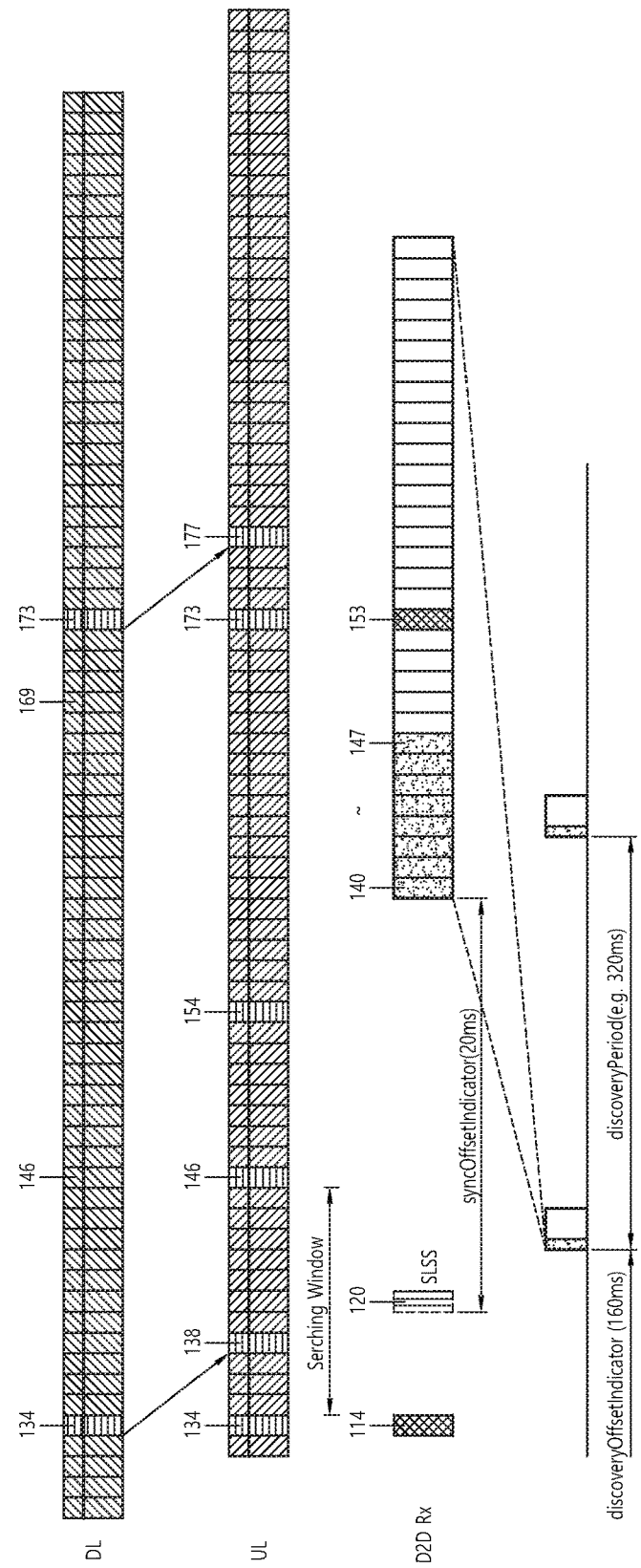

USER APPARATUS INCLUDING A DEDICATED RF CHAIN FOR PROSE AND TRANSMITTING AND RECEIVING METHOD

CROSS-REFERENCE TO RELATED APPLICATIONS

Pursuant to 35 U.S.C. § 119, this application claims the benefit of earlier filing date and right of priority to Korean patent application No. 10-2016-0058535, filed on May 13, 2016, and also claims the benefit of U.S. Provisional application No. 62/161,898, filed on May 15, 2015, the contents of which are all incorporated by reference herein in their entirety.

BACKGROUND OF THE INVENTION

Field of the Invention

The present invention relates to mobile communication.

Discussion of the Related Art $3^{rd}$ generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V10.4.0 (2011-12) "Evolved Universal Terrestrial Radio Access (E-UTRA); Physical Channels and Modulation (Release 10)", 3GPP LTE/LTE-A may divide the physical channel into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

Meanwhile, communication between UEs which are physically closed to each other, that is, device to device (D2D) communication) is required due to an increase in user requirements for a social network service (SNS).

The D2D communication may be called a proximity service (ProSe). In addition, a UE that performs the proximity service may be called a ProSe UE. In addition, a link between the UEs used in the D2D communication may be called a sidelink.

For the ProSe, the UE may include a separate RF chain.

However, when the separate RF chain is provided, there is a problem in that power consumption may increase.

SUMMARY OF THE INVENTION

Accordingly, the disclosure of the specification has been made in an effort to solve the problem.

In order to achieve the aforementioned object, in accordance with an embodiment of the present invention, there is provided a transmitting/receiving method performed by a user equipment (UE) including a dedicated radio frequency (RF) chain for a proximity service (ProSe). The method may comprise: receiving configuration information for a discovery resource pool, the discovery resource pool including a bitmap representing a subframe used for a discovery signal and information representing the number of times when the bitmap is repeated; turning on the dedicated RF chain based on a subframe corresponding to a first bit 1 in a bit string enumerated by the bitmap and the number of repetition times; turning on the dedicated RF chain and thereafter, transmitting/receiving a signal to/from an adjacent UE; and turning off the dedicated RF chain based on a subframe corresponding to a last bit 1 in the bit string.

When in the bit string, the subframe corresponding to the first bit 1 is a k subframe and in the bit string, the subframe corresponding to the last bit 1 may be a p subframe, and the dedicated RF chain may be turned on in a k−2-th subframe and turned off in a p+2-th subframe.

When in the bit string, the subframe corresponding to the first bit 1 is the k subframe and in the bit string, the subframe corresponding to the last bit 1 may be the p subframe, and the dedicated RF chain may be turned on in a k−1-th subframe and turned off in a p+1-th subframe.

In order to achieve the aforementioned object, in accordance with an embodiment of the present invention, there is provided a transmitting/receiving method performed by a user equipment (UE) including a dedicated radio frequency (RF) chain for a proximity service (ProSe). The method may comprise: receiving configuration information for a sidelink synchronization signal (SLSS), the configuration information includes information on a window for receiving the SLSS; receiving configuration information for a discovery resource pool, the discovery resource pool including a bitmap representing a subframe used for a discovery signal and information representing the number of times when the bitmap is repeated; turning on the dedicated RF chain in a subframe before the window for receiving the SLSS; and turning on the dedicated RF chain and thereafter, transmitting/receiving a signal to/from an adjacent UE; and turning on the dedicated RF chain based on a subframe corresponding to a last bit 1 in a bit string enumerated by the bitmap and the number of repetition times.

When the SLSS is received in an n-th subframe, and in the bit string, the subframe corresponding to the last bit 1 may be a p-th subframe, and the dedicated RF chain may be turned on in an n−6-th subframe and turned off in a p+6-th subframe.

In order to achieve the aforementioned object, in accordance with an embodiment of the present invention, there is provided a user equipment (UE). The UE may comprise: a radio frequency (RF) chain receiving configuration information for a discovery resource pool; a dedicated RF chain for a proximity service (ProSe); and a processor controlling the RF chain and the dedicated RF chain. The processor may turn on the dedicated RF chain based on a subframe corresponding to a first bit 1 in a bit string enumerated by the bitmap and the number of repetition times and thereafter, transmit/receive a signal to/from an adjacent UE and turn off the dedicated RF chain based on a subframe corresponding to a last bit 1 in the bit string.

According to the disclosure of the specification, the problem in the related art is solved.

BRIEF DESCRIPTION OF THE DRAWINGS

FIG. 8*b* illustrates the number of times to cause stopping WAN UL transmission the receiving relationship among WAN DL, WAN UL, and D2D by turning on/off the separate RF chain according to option 1 and scheme 2 under the synchronization network environment.

FIGS. 11A, 11B, 11C, and 11D illustrate the number of times to cause stopping WAN UL transmission the receiving relationship among WAN DL, WAN UL, and D2D by turning on/off the separate RF chain according to scheme 1, scheme 2, scheme 3, and scheme 4, respectively under the synchronization network environment.

DETAILED DESCRIPTION OF THE EMBODIMENTS

Figure 1:
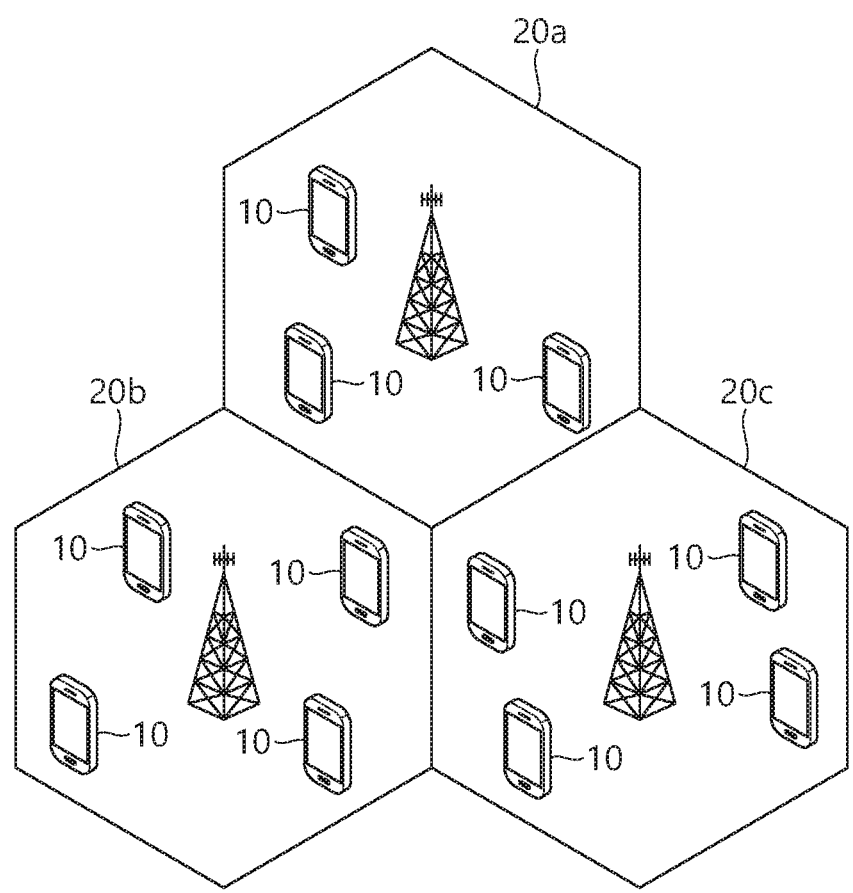
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20*a*, 20*b*, and 20*c*. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Operating bands used in the wireless communication system are described below.

TABLE 1

| E-UTRA Operating Band | Uplink (UL) operating band $F_{UL\_low}$-$F_{UL\_high}$ | Downlink (DL) operating band $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 61 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A N/A | 717 MHz-728 MHz | FDD |
| 30 | 2305 MHz-2315 MHz | 2350 MHz-2360 MHz | FDD |
| 31 | 452.5 MHz-457.5 MHz | 462.5 MHz-467.5 MHz | FDD |
| 32 | N/A N/A | 1452 MHz-1496 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz 2690 MHz | 2496 MHz 2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |

Herein, $F_{UL\_low}$ means a lowest frequency of the uplink operating band. In addition, $F_{UL\_high}$ means a highest frequency of the uplink operating band. Further, $F_{UL\_low}$ means a lowest frequency of the downlink operating band. Besides, $F_{UL\_high}$ means a highest frequency of the downlink operating band.

In addition, the bands are grouped as below.

TABLE 2

| | E-UTRA FDD | | E-UTRA TDD | |
|---|---|---|---|---|
| Group | Band group name | Operating band | Band group name | Operating band |
| A | FDD_A | 1, 4, 6, 10, 11, 18, 19, 21, 23, 24, 32, 67 | TDD_A | 33, 34, 35, 36, 37, 38, 39, 40, 45 |
| B | FDD_B | 65, 66 | TDD_B | — |
| C | FDD_C | 9, 30 | TDD_C | 42, 43 |
| D | FDD_D | 28 | TDD_D | — |
| E | FDD_E | 2, 5, 7, 27 | TDD_E | 41, 44 |
| F | FDD_F | 26 | TDD_F | — |
| G | FDD_G | 3, 8, 12, 13, 14, 17, 20, 22, 29 | TDD_G | — |
| H | FDD_H | 25 | TDD_H | — |
| I | FDD_I | — | TDD_I | — |
| J | FDD_J | — | TDD_J | — |
| K | FDD_K | — | TDD_K | — |
| L | FDD_L | — | TDD_L | — |
| M | FDD_M | — | TDD_M | — |
| N | FDD_N | 31 | TDD_N | — |

Hereinafter, the LTE system will be described in more detail.

Figure 2:
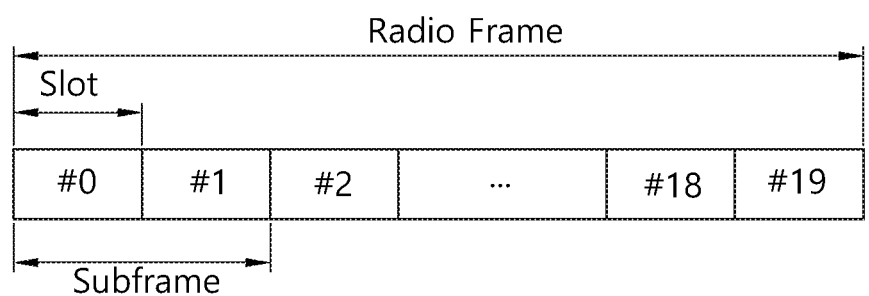
FIG. 2 illustrates a structure of a radio frame according to FDD in 3GPP LTE.

FIG. 2 illustrates a structure of a radio frame according to FDD in 3GPP LTE.

Clause 5 of 3GPP TS 36.211 V10.4.0 (2011-12) "Evolved Universal Terrestrial Radio Access (E-UTRA); Physical Channels and Modulation (Release 10)" may be referred to for the radio frame illustrated in FIG. 2.

Referring to FIG. 2, the radio frame includes 10 subframes and one subframe includes 2 slots. The slots in the radio frame are assigned with slot numbers #0 to #19. A time required to transmit one subframe is referred to as a transmissions time interval (TTI). The TTI may be a scheduling unit for data transmission. For example, the length of one radio frame may be 10 ms, the length of one subframe may be 1 ms, and the length of one slot may be 0.5 ms.

The structure of the radio frame is just exemplary and the number of subframes included in the radio frame or the number of slots included in the subframe may be variously modified.

Meanwhile, one slot may include a plurality of orthogonal frequency division multiplexing (OFDM) symbols. The number of OFDM symbols included in one slot may depend on a cyclic prefix (CP). In a normal CP, 1 slot includes 7 OFDM symbols and in an extended CP, 1 slot includes 6 OFDM symbols. Herein, since the 3GPP LTE uses orthogonal frequency division multiple access (OFDMA) in a downlink (DL), the OFDM symbol is just used for expressing one symbol period in a time domain and a multi access scheme or a name is not limited. For example, the OFDM symbol may be called other names including a single carrier-frequency division multiple access (SC-FDMA) symbol, a symbol period, and the like.

Figure 3:
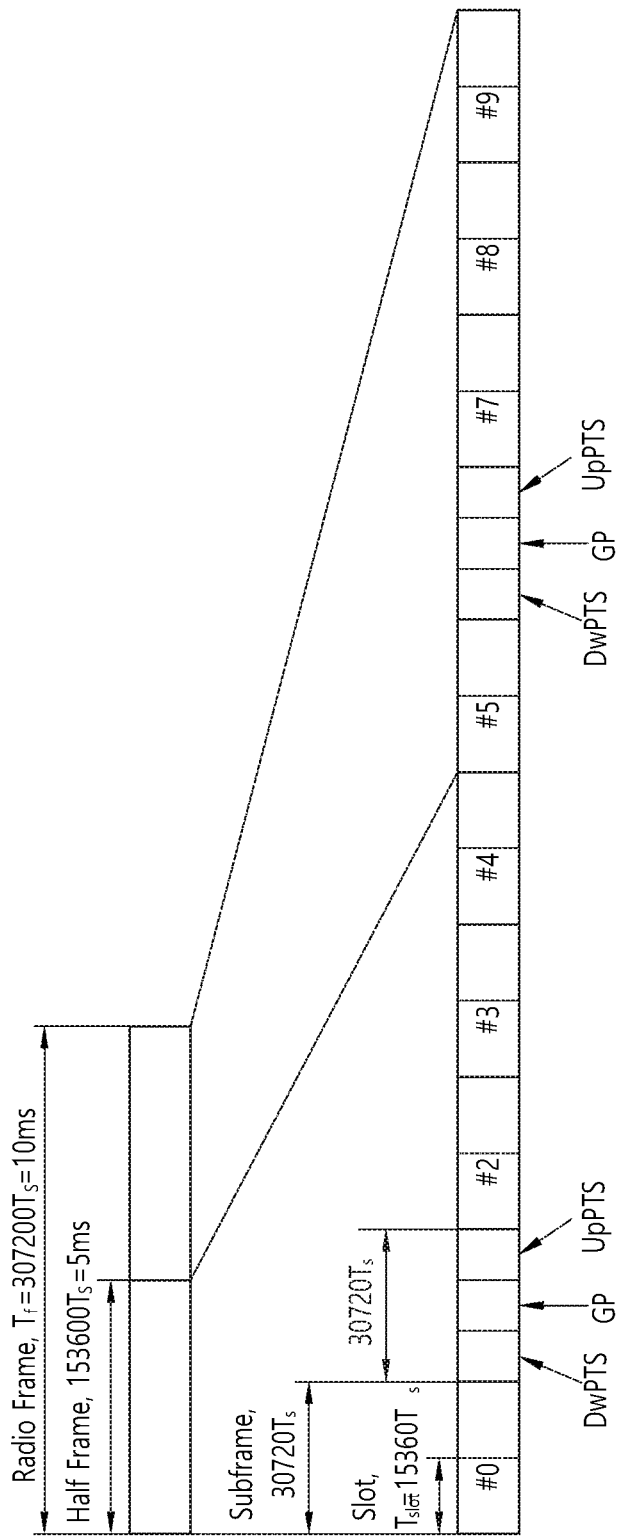
FIG. 3 illustrates a structure of a downlink radio frame according to TDD in the 3GPP LTE.

FIG. 3 illustrates a structure of a downlink radio frame according to TDD in the 3GPP LTE.

Clause 4 of 3GPP TS 36.211 V10.4.0 (2011-12) "Evolved Universal Terrestrial Radio Access (E-UTRA); Physical Channels and Modulation (Release 10)" may be referred to for the structure of the downlink radio frame and the structure of the downlink radio frame is used for time division duplex (TDD).

A subframe having index #1 and index #6 is referred to as a special subframe and includes a downlink pilot time slot (DwPTS), a guard period (GP), and an uplink pilot time slot (UpPTS). The DwPTS is used for initial cell discovery, synchronization, or channel estimation in the UE. The UpPTS is used for channel estimation in a base station and to match uplink transmission synchronization of the UE. The GP is a period for removing interference which occurs in uplink due to multi-path delay of a downlink signal between the uplink and the downlink.

In the TDD, a downlink (DL) subframe and an uplink (UL) subframe coexist in one radio frame. Table 1 shows one example of a configuration of the radio frame.

TABLE 3

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' represents the DL subframe, 'U' represents the UL subframe, and 'S' represents the special subframe. When the UE receives the UL-DL configuration from the base station, the UE may find which subframe is the DL subframe or the UL subframe according to the configuration of the radio frame.

TABLE 4

| | | Normal CP in downlink | | | Extended CP in downlink | | |
|---|---|---|---|---|---|---|---|
| | | | UpPTS | | | DwPTS | |
| Special subframe configuration | DwPTS | | Normal CP in uplink | Extended CP in uplink | DwPTS | Normal CP in uplink | Extended CP in uplink |
| 0 | 6592 * Ts | | 2192 * Ts | 2560 * Ts | 7680 * Ts | 2192 * Ts | 2560 * Ts |
| 1 | 19760 * Ts | | | | 20480 * Ts | | |
| 2 | 21952 * Ts | | | | 23040 * Ts | | |
| 3 | 24144 * Ts | | | | 25600 * Ts | | |
| 4 | 26336 * Ts | | | | 7680 * Ts | 4384 * Ts | 5120 * Ts |
| 5 | 6592 * Ts | | 4384 * Ts | 5120 * ts | 20480 * Ts | | |
| 6 | 19760 * Ts | | | | 23040 * Ts | | |

TABLE 4-continued

| Special subframe configuration | Normal CP in downlink | | | Extended CP in downlink | | |
|---|---|---|---|---|---|---|
| | | UpPTS | | | DwPTS | |
| | DwPTS | Normal CP in uplink | Extended CP in uplink | DwPTS | Normal CP in uplink | Extended CP in uplink |
| 7 | 21952 * Ts | | | — | | |
| 8 | 24144 * Ts | | | — | | |

Figure 4:
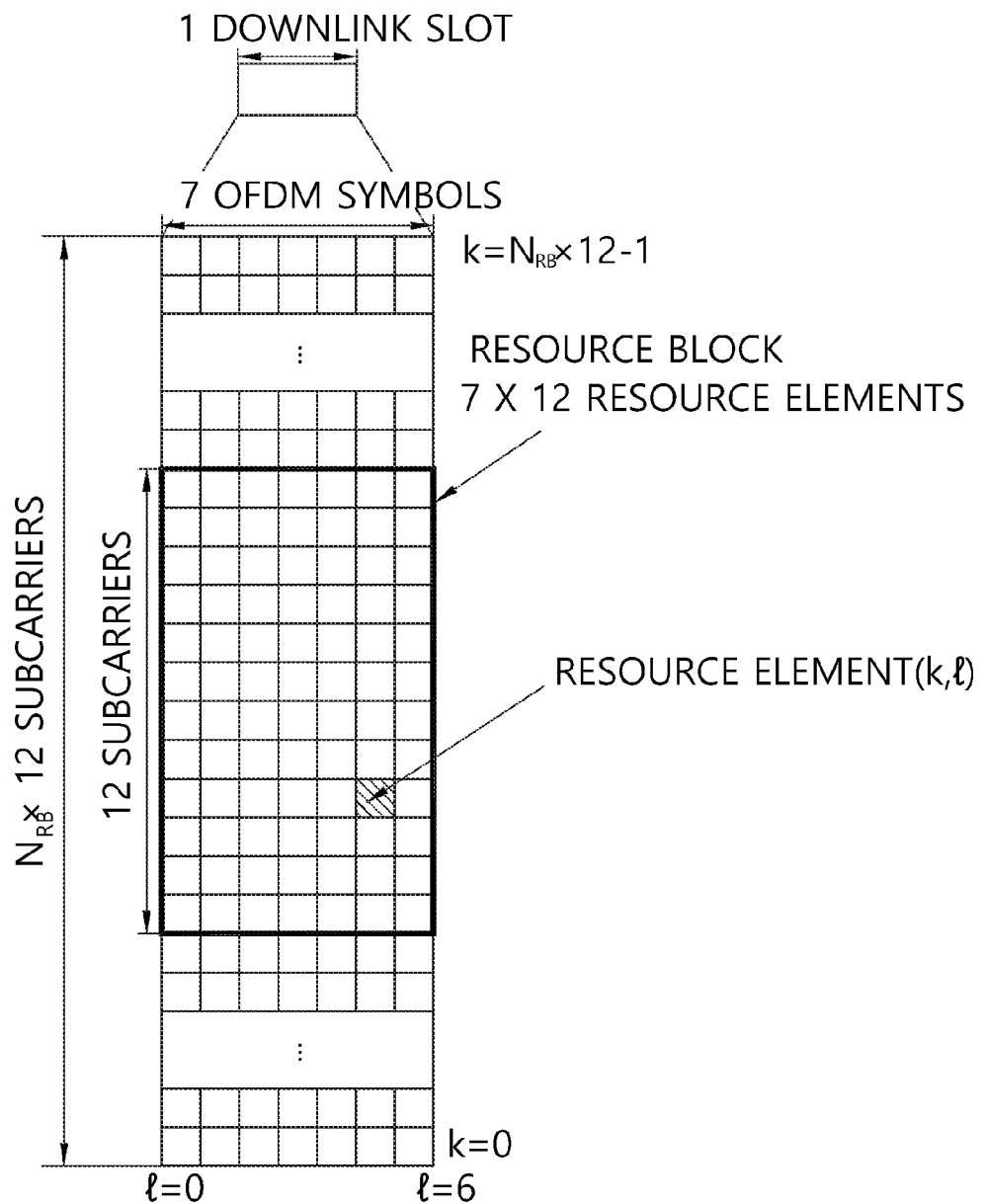
FIG. 4 is an exemplary diagram illustrating a resource grid for one uplink or downlink slot in the 3GPP LTE.

FIG. 4 is an exemplary diagram illustrating a resource grid for one uplink or downlink slot in the 3GPP LTE.

Referring to FIG. 4, the slot includes orthogonal frequency division multiplexing (OFDM) symbols in the time domain and NRB resource blocks (RBs) in a frequency domain. For example, in the LTE system, the number of resource blocks (RB), that is, NRB may be any one of 6 to 110.

The resource block (RB) as a resource assignment unit includes a plurality of subcarriers in one slot. For example, if one slot includes 7 OFDM symbols in the time domain and the resource block includes 12 subcarriers in the frequency domain, one resource block may include 7×12 resource elements (REs).

Meanwhile, as the number of subcarriers in one OFDM symbol, one of 128, 256, 512, 1024, 1536, and 2048 may be selected and used.

In the 3GPP LTE of FIG. 4, a resource grid for one uplink slot may be applied even to a resource grid for the downlink slot.

<Carrier Aggregation>

Now, a carrier aggregation (CA) system will be described.

The carrier aggregation (CA) system means aggregating multiple component carriers (CCs). By the carrier aggregation, the existing meaning of the cell is changed. According to the carrier aggregation, the cell may mean a combination of a downlink component carrier and an uplink component carrier or a single downlink component carrier.

Further, in the carrier aggregation, the cell may be divided into a primary cell, secondary cell, and a serving cell. The primary cell means a cell that operates at a primary frequency and means a cell in which the UE performs an initial connection establishment procedure or a connection reestablishment procedure with the base station or a cell indicated by the primary cell during a handover procedure. The secondary cell means a cell that operates at a secondary frequency and once an RRC connection is established, the secondary cell is configured and is used to provide an additional radio resource.

As described above, in the carrier aggregation system, a plurality of component carriers (CCs), that is, a plurality of serving cells may be supported unlike a single carrier system.

The carrier aggregation system may support cross-carrier scheduling. The cross-carrier scheduling is a scheduling method that may assign a resource a PDSCH transmitted through other component carrier through a PDCCH transmitted through a specific component carrier and/or assign a resource of a PUSCH transmitted through other component carrier other than a component carrier fundamentally linked with the specific component carrier.

<Device to Device (D2D) Communication>

On the other hand, hereinafter, the D2D communication expected to be introduced in a next-generation communication system will be described.

Figure 5:
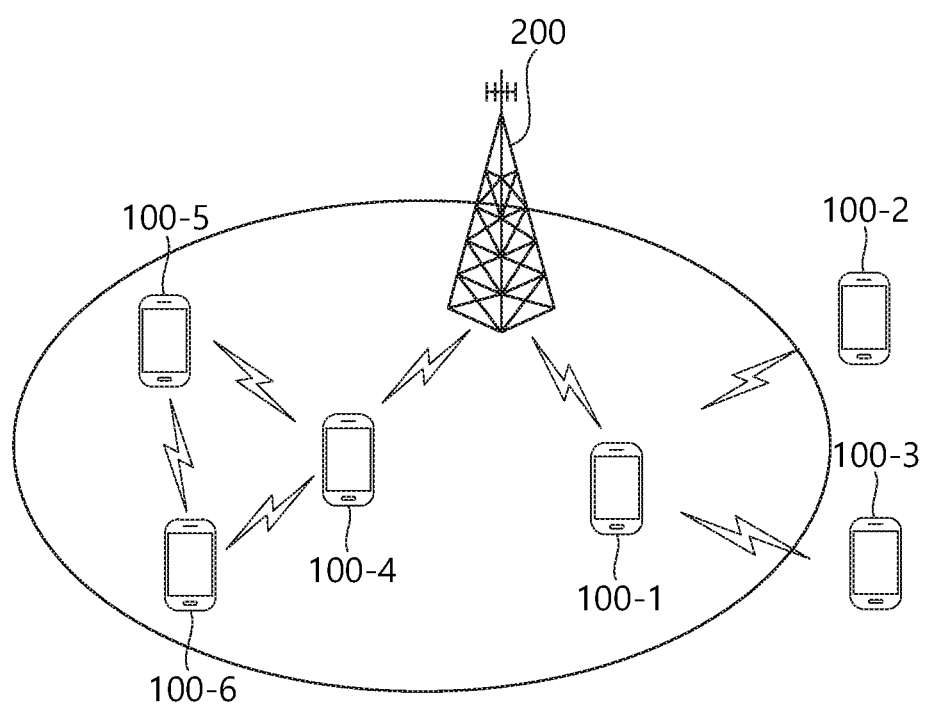
FIG. 5 illustrates a concept of device to device (D2D) communication expected to be introduced in a next-generation communication system.

FIG. 5 illustrates a concept of device to device (D2D) communication expected to be introduced in a next-generation communication system.

Communication between UEs which are physically closed to each other, that is, device to device (D2D) communication) is required due to an increase in user requirements for a social network service (SNS).

In order to reflect the aforementioned requirements, as illustrated in FIG. 5, a scheme that allows the UE#1 100-1, the UE#2 100-2, and the UE#3 100-3 or the UE#4 100-4, the UE#5 100-5, and the UE#6 100-6 to directly communicate with each other without intervention of a base station (eNodeB) 200 is discussed. Of course, the UE#1 100-1 and the UE#4 100-4 may directly communicate with each other under a help of the base station (eNodeB) 200. Meanwhile, the UE#4 100-4 may serve as a repeater for the UE#5 100-5 and the UE#6 100-6. Similarly, the UE#1 100-1 may serve as the repeater for the UE#2 100-2 and the UE#3 100-3.

Meanwhile, the D2D communication may be called a proximity service (ProSe). In addition, a UE that performs the proximity service may be called a ProSe UE. Moreover, a link between the UEs used in the D2D communication may be called a sidelink. Frequency bands which may be used for the sidelink are described below.

TABLE 5

| Sidelink band | E-UTRA band | Transmission FUL_low-FUL_high | Reception FDL_low-FDL_high | Duplex mode |
|---|---|---|---|---|
| 2 | 2 | 1850 MHz-1910 MHz | 1850 MHz-1910 MHz | HD |
| 3 | 3 | 1710 MHz-1785 MHz | 1710 MHz-1785 MHz | HD |
| 4 | 4 | 1710 MHz-1755 MHz | 1710 MHz-1755 MHz | HD |
| 7 | 7 | 2500 MHz-2570 MHz | 2500 MHz-2570 MHz | HD |
| 14 | 14 | 788 MHz-798 MHz | 788 MHz-798 MHz | HD |
| 20 | 20 | 832 MHz-862 MHz | 832 MHz-862 MHz | HD |
| 26 | 26 | 814 MHz-849 MHz | 814 MHz-849 MHz | HD |
| 28 | 28 | 703 MHz-748 MHz | 703 MHz-748 MHz | HD |
| 31 | 31 | 452.5 MHz-457.5 MHz | 452.5 MHz-457.5 MHz | HD |
| 41 | 41 | 2496 MHz-2690 MHz | 2496 MHz-2690 MHz | HD |

Physical channels used for the side link are described below.
PSSCH(Physical Sidelink Shared Channel)
PSCCH(Physical Sidelink Control Channel)
PSDCH(Physical Sidelink Discovery Channel)
PSBCH(Physical Sidelink Broadcast Channel)

Further, physical signals used for the sidelink are described below.
Demodulation Reference signal (DMRS)
Sidelink Synchronization signal (SLSS)

The SLSS includes a primary SLSS (PSLSS) and a secondary SLSS (SSLSS).

Figure 6:
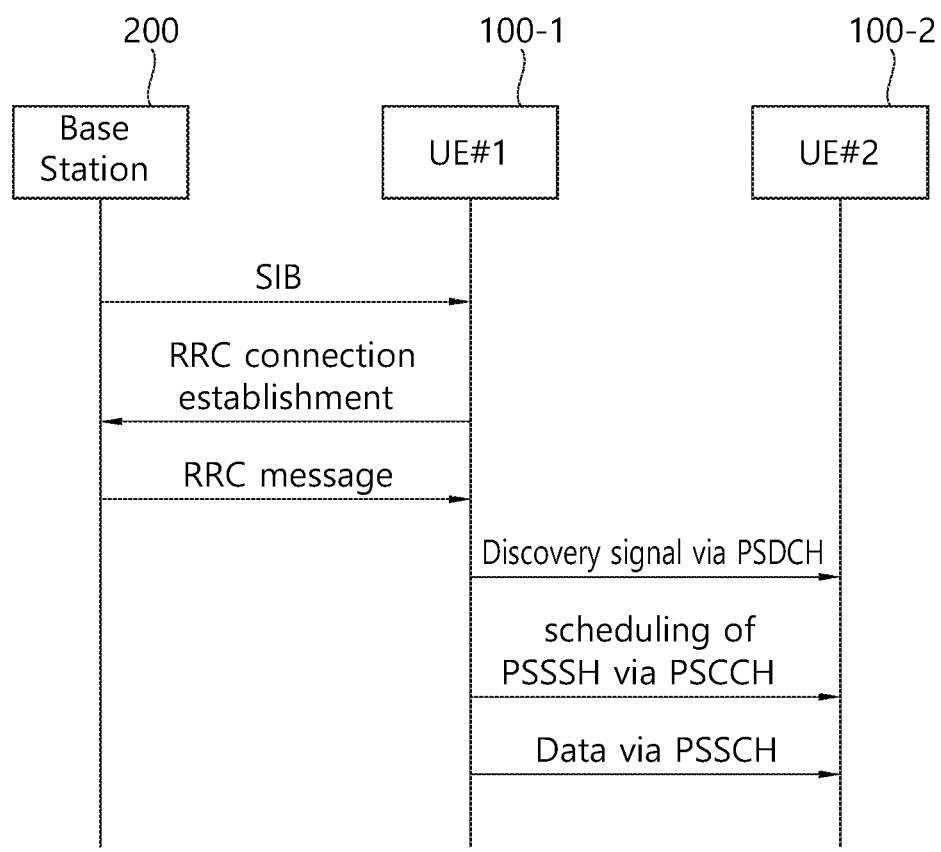
FIG. 6 illustrates an example of D2D communication or ProSe communication between UE#1 and UE#2 illustrated in FIG. 5.

FIG. 6 illustrates an example of D2D communication or ProSe communication between UE#1 and UE#2 illustrated in FIG. 5.

Referring to FIG. 6, the base station 200 broadcasts a system information block (SIB) into the cell.

The SIB may include information on a resource pool associated with the D2D communication. The information on the resource pool associated with the D2D communication may be divided into SIB type 18 and SIB type 19.

The SIB type 18 may include resource configuration information for the D2D communication. In addition, the SIB type 19 may include resource configuration information associated with a D2D discovery.

The SIB type 19 includes discSyncConfig as below.

TABLE 6

| SIB type 19 | |
| --- | --- |
| discSyncConfig | Represents a configuration regarding whether the UE is permitted to receive or transmit synchronization information. When the base station (E-UTRAN) makes the UE transmit the synchronization information by using dedicated signaling, the base station (E-UTRAN) may configure discSyncConfig. |

The discSyncConfig includes SL-SyncConfig. The SL-SyncConfig includes configuration information for receiving the SLSS and transmitting the SLSS as shown in a table given below.

TABLE 7

| SL-SyncConfig field description | |
| --- | --- |
| discSyncWindow | Called even a searching window. Represents a synchronization window in which the UE expects the SLSS. A value may be set to w1 or w2. The w1 value represents 5 milliseconds and the w2 value corresponds to a length acquired by the normal CP by 2. |
| syncTxPeriodic | Represents whether the UE transmits the SLSS once within one period of a discovery signal transmitted thereby or periodically (for example, every 40 ms). In the case of the periodic transmission, the UE further transmits MasterInformationBlock-SL. |
| syncTxThreshIC | Represents a threshold used when the UE is positioned in coverage. When an RSRP value measured for a counterpart UE (recognized like the cell) selected for the sidelink communication is smaller than the threshold, the UE may transmit the SLSS for the sidelink communication with the counterpart UE. |
| txParameters | Includes a parameter regarding a configuration for transmission. |

Meanwhile, the UE#1 100-1 positioned in the coverage of the base station 200 establishes the RRC connection with the base station.

In addition, the UE#1 100-1 receives an RRC message, for example, an RRC Connection Reconfiguration message from the base station 200. The RRC message includes a discovery configuration (hereinafter, referred to as discConfig). The discConfig includes configuration information for a discover resource pool (hereinafter, referred to as DiscResourcePool) for the discovery. The DiscResourcePool includes information shown in a table given below.

TABLE 8

| DiscResourcePool | |
| --- | --- |
| discPeriod | May be written even as a discovery period and as a period of a resource assigned in the cell for transmitting/receiving the discovery message may be called a PDSCH period. A value may be rf32, rf64, rf128, rf256, rf512, rf1024, or the like. The value represents the number of radio frames. That is, when the value is rf32, the rf32 represents 32 radio frames. |
| numRepetition | Represents the number of times when subframeBitmap for mapping to a subframe generated within discPeriod is repeated. The base station configures numRepetition and subframeBitmap so that the mapped subframe does not exceed the discPeriod. |
| TF-ResourceConfig | Designates a set of time/frequency resources used for the sidelink communication. |

The TF-ResourceConfig includes information shown in a table given below.

TABLE 9

```
SL-TF-ResourceConfig-r12 ::=    SEQUENCE {
    prb-Num-r12                     INTEGER (1..100),
    prb-Start-r12                   INTEGER (0..99),
    prb-End-r12                     INTEGER (0..99),
    offsetIndicator-r12             SL-OffsetIndicator-r12,
    subframeBitmap-r12              SubframeBitmapSL-r12
}
```

The SubframeBitmapSL is shown in a table given below.

TABLE 10

| | |
|---|---|
| SubframeBitmapSL | May be written even as discoverySubframeBitmap and designates a subframe bitmap representing a resource used for the sidelink. A value may be designated as bs4, bs8, bs12, bs16, bs30, bs40, bs40, and the like. For example, the bs40 value means a bit string length 40. |

The SL-OffsetIndicator includes information shown in a table given below.

TABLE 11

| | |
|---|---|
| SL-OffsetIndicator | May be written even as discoveryOffsetIndicator and represents an offset of a first period of the resource pool within an SFN cycle. |
| SL-OffsetIndicatorSync | May be written even as SyncOffsetIndicator and represents a relationship between SFNs including a synchronization resource and the subframes according to an equation. (SFN * 10 + Subframe Number) mod 40 = SL-OffsetIndicatorSync. |

Meanwhile, the UE#1 100-1 may transmit the discovery signal through the PDSCH in order to discover whether an appropriate UE is present therearound or notify the presence of the UE#1 100-1 for the D2D communication or ProSe communication.

Meanwhile, further, the UE#1 100-1 may transmit scheduling assignment (SA) through the PSCCH. In addition, the UE#1 100-1 may transmit the PSSCH including data based on the scheduling assignment (SA).

Figure 7:
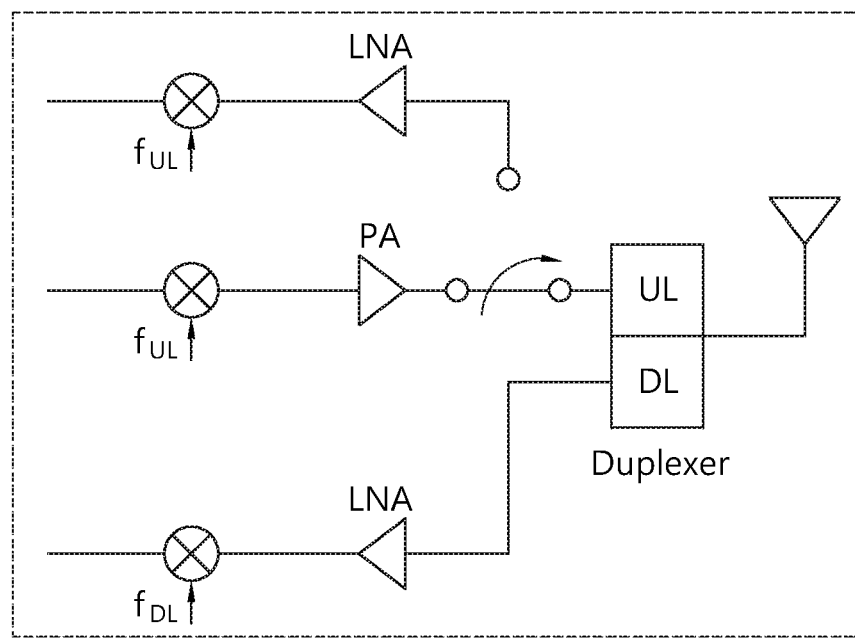
FIG. 7 illustrates an RF structure of a UE for the D2D communication or the ProSe communication.

FIG. 7 illustrates an RF structure of a UE for the D2D communication or the ProSe communication.

As known with reference to Tables 1 and 5 given above, the frequency band used for the D2D communication or ProSe communication is an uplink frequency band used for communication (hereinafter, referred to as WAN communication) between the UE and the base station. Accordingly, as illustrated in FIG. 7, for the D2D communication or ProSe communication, in the RF structure of the UE, a separate RF chain for the D2D communication is added to the uplink frequency band. In addition, a switch is added to the separate RF chain. When an uplink transmission signal for the WAN communication is transmitted, the switch connects an output of a power amplifier (PA) which is illustrated toward an antenna (that is, connected through a duplexer). Similarly, when a transmission signal for the D2D communication or ProSe communication is transmitted, the switch connects the output of the power amplifier (PA) which is illustrated toward the antenna. However, when a reception signal for the D2D communication or ProSe communication is transmitted, the switch connects a reception signal from the duplexer to a low noise amplifier.

As described above, as the switch operates, transmission of the WAN communication is turned on/off. Similarly, reception of the D2D communication or ProSe communication is also turned on/off.

However, there is a problem in that the WAN communication is interrupted due to the on/off.

<Disclosures of Present Specification>

Accordingly, the disclosures of the specification have been made in an effort to provide a scheme for solving the problem. In detail, the disclosures of the present specification have been made in an effort to present a scheme for enabling efficient resource assignment and further, reducing power consumption of the UE while minimizing interruption of the WAN communication by the D2D communication or ProSe communication.

Hereinafter, when the frequency band used in the D2D communication or ProSe communication is different from the frequency band used in the WAN communication, the scheme is proposed in two cases of a case where the cells synchronize with each other (synchronous network) and a case where the cells do not synchronize with each other (asynchronous network).

To this end, a simulation is performed. Parameters used in the simulation are described below. — discoverySubframeBitmap=11111111_00000000_00000000_00000000 numRepetition=1 discoveryOffsetIndicator=160 ms discovery period=320 ms

SyncOffsetIndicator=20 ms (for the asynchronous network)

Further, the simulation is performed in two respective options described below.

Optional 1: It is assumed that the base station does not schedule the PDSCH in the DL subframe associated with a UL ACK/NACK subframe corresponding to the discovery, which includes the SLSS and the searching window.

Optional 2: It is assumed that the base station schedules the PDSCH on all DL subframes.

I. Synchronous Network Environment

A result of performing the simulation with respect to each of Options 1 and 2 by assuming the aforementioned parameters will be described with reference to drawings. However, a timing of turning on/off the separate RF chain for the D2D communication for the simulation is described below.

Scheme 1: Turning on/off the separate RF chain for the D2D communication before and after "discoverySubframeBitmap×numRepetition"

Scheme 2: Turning on/off the separate RF chain for the D2D communication before a subframe corresponding to first 1 of discoverySubframeBitmap and after a subframe corresponding to last 1 of discoverySubframeBitmap in "discoverySubframeBitmap×numRepetition"

Figure 8A:
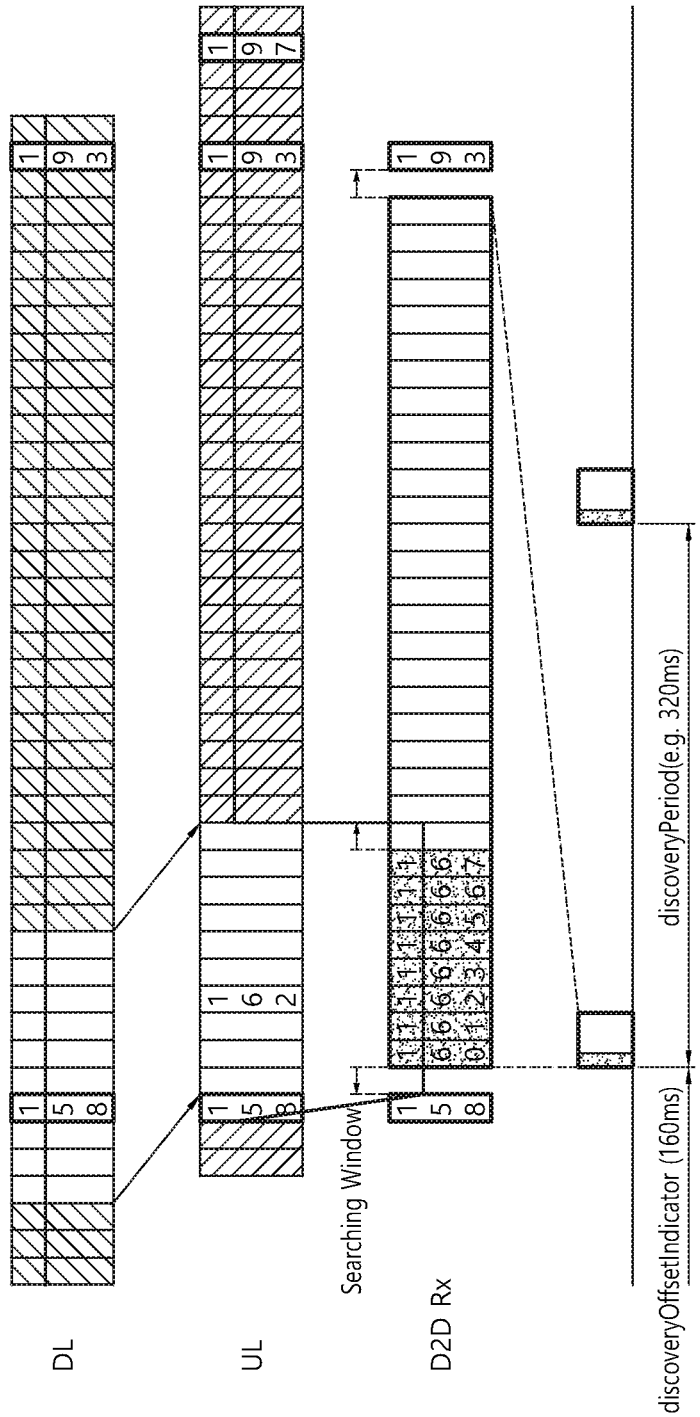
FIG. 8*a* illustrates the number of times to cause stopping WAN UL transmission a receiving relationship among WAN DL, WAN UL, and D2D by turning on/off the separate RF chain according to option 1 and scheme 1 under a synchronization network environment.

FIG. 8*a* illustrates the number of times to cause stopping WAN UL transmission a receiving relationship among WAN DL, WAN UL, and D2D by turning on/off the separate RF chain according to option 1 and scheme 1 under a synchronization network environment. In addition, FIG. 8*b* illustrates the number of times to cause stopping WAN UL transmission the receiving relationship among WAN DL, WAN UL, and D2D by turning on/off the separate RF chain according to option 1 and scheme 2 under a synchronization network environment.

Referring to FIG. 8*a*, it is expressed that subframes in which the separate RF chain for the D2D is turned on/off according to scheme 1 are DL subframes #158 and #193. In this case, interruption occurs due to the turn-on/off of the separate RF chain for the D2D on UL ACK/NACK subframe #197 corresponding to DL subframe #193. All subframes in which UL transmission is interrupted are subframes #158, #193, and #197. In addition, the number of subframes in which the interruption occurs is 3 per 320 ms. Herein, an operation between D2D reception and WAN UL transmission is similar to a TDD operation on subframes #168 and #169. When a last symbol is punctured in the D2D, it may be regarded that this is similar to a gap on a TDD special subframe, it does not matter.

Meanwhile, referring to FIG. 8b, it is expressed that subframes in which the separate RF chain for the D2D is turned on/off according to scheme 2 are subframes #158 and #169. In this case, the interruption occurs due to the turn-on/off of the separate RF chain for the D2D on UL ACK/NACK subframe #173 corresponding to the DL subframe. All subframes in which the UL transmission is interrupted are subframes #158, #169, and #173. In addition, the number of subframes in which the interruption occurs is 3 per 320 ms. A difference from FIG. 8a is that on/off switching of the separate RF chain for the D2D communication is first performed as long as 24 subframes in FIG. 8b. This is an advantage in terms of reducing the power consumption of the UE.

Meanwhile, in FIGS. 8a and 8b, the number of transmitted ACK/NACKs which the UE loses is 3 for 320 ms.

Figure 9A:
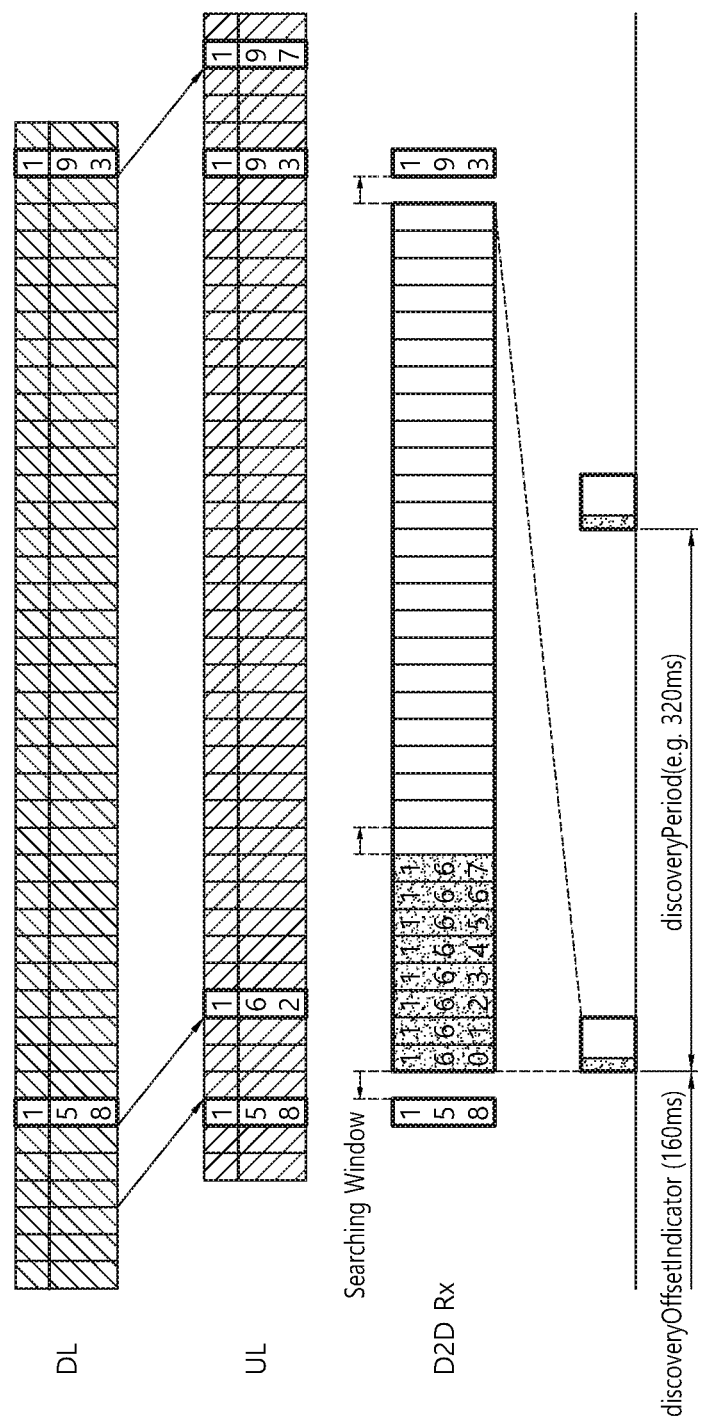
FIG. 9A illustrates the number of times to cause stopping WAN UL transmission a receiving relationship among WAN DL, WAN UL, and D2D by turning on/off the separate RF chain according to option 2 and scheme 1 under the synchronization network environment.
Figure 9B:
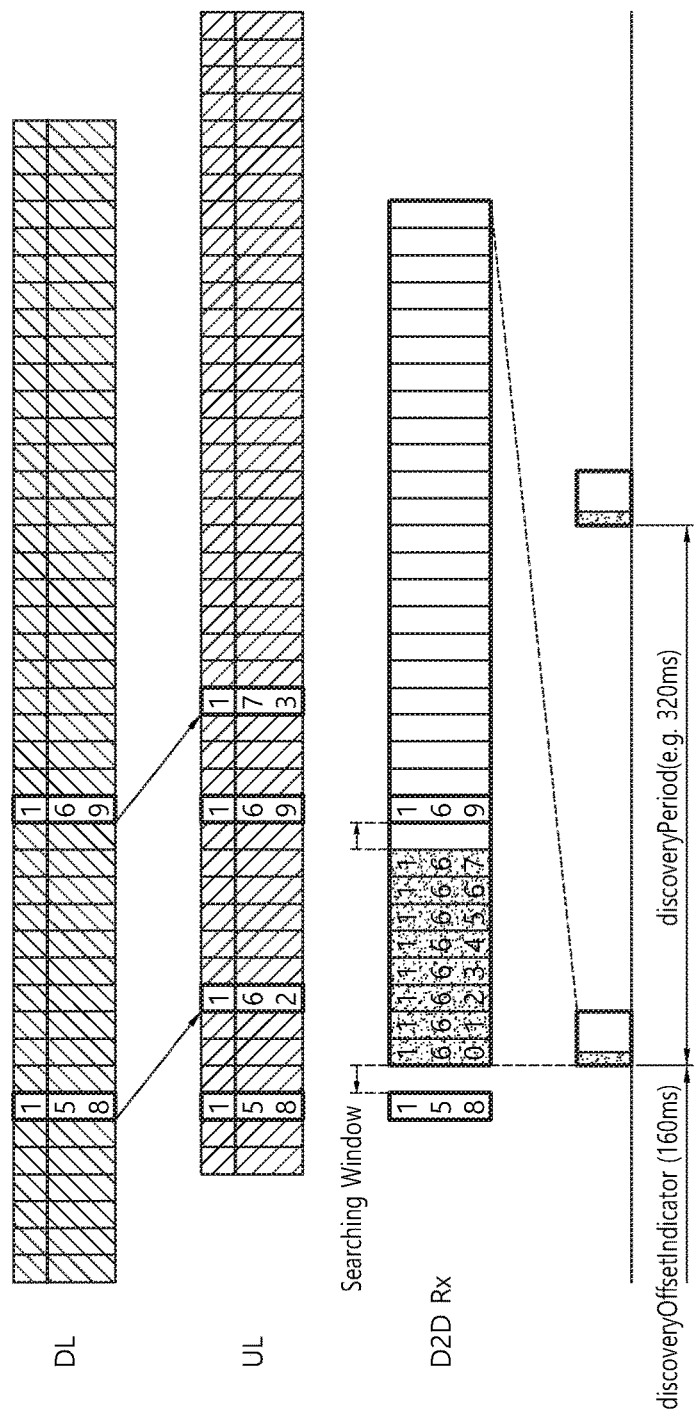
FIG. 9B illustrates the number of times to cause stopping WAN UL transmission the receiving relationship among WAN DL, WAN UL, and D2D by turning on/off the separate RF chain according to option 2 and scheme 2 under the synchronization network environment.

FIG. 9A illustrates the number of times to cause stopping WAN UL transmission a receiving relationship among WAN DL, WAN UL, and D2D by turning on/off the separate RF chain according to option 2 and scheme 1 under the synchronization network environment. FIG. 9B illustrates the number of times to cause stopping WAN UL transmission the receiving relationship among WAN DL, WAN UL, and D2D by turning on/off the separate RF chain according to option 2 and scheme 2 under the synchronization network environment.

Referring to FIGS. 9A and 9B, the number of transmitted ACK/NACKs which the UE loses is 4.

In addition, referring to FIG. 9B, according to scheme 2, it is advantageous in terms of reducing the power consumption of the UE in that switching of the separate RF chain is first performed as long as 24 subframes.

This is organized by a table given below. Referring to a table given below, the number of subframes in which the transmission loss of the ACK/NACK and the power consumption are reduced according to the on/off subframe of the separate RF chain is shown.

TABLE 12

| | PDSCH scheduling | | | |
| | Option 1 | | Option 2 | |
| | On/off switching scheme of separate RF chain | | | |
| | Scheme 1 | Scheme 2 | Scheme 1 | Scheme 2 |
| The number of Ack/Nacks lost | 3 | 3 | 4 | 4 |
| PDSCH scheduling | 310 | 310 | 320 | 320 |
| Loss rate (%) of Ack/Nack | 0.97 | 0.97 | 1.25 | 1.25 |
| The number of subframes in which the separate RF chain is turned on for D2D reception | 35 | 11 | 35 | 11 |

II. Asynchronous Network Environment

A result of performing the simulation with respect to each of Options 1 and 2 by using the aforementioned parameters as they are will be described with reference to drawings. However, a timing of turning on/off the separate RF chain for the D2D communication for the simulation is described below.

Scheme 1: Turning on/off the separate RF chain for the D2D communication before and after "SLSS" and before and after "discoverySubframeBitmap×numRepetition"

Scheme 2: Turning on/off the separate RF chain for the D2D communication before and after "SLSS" and before a subframe corresponding to first 1 of discoverySubframeBitmap and after a subframe corresponding to last 1 of discoverySubframeBitmap in "discoverySubframeBitmap×numRepetition"

Scheme 3: Turning on/off the separate RF chain for the D2D communication before "SLSS" and after "discoverySubframeBitmap×numRepetition"

Scheme 4: Turning on/off the separate RF chain for the D2D communication before "SLSS" and after the subframe corresponding to last 1 of discoverySubframeBitmap in "discoverySubframeBitmap×numRepetition"

FIGS. 10A, 10B, 10C, and 10D illustrate the number of times to cause stopping WAN UL transmission a receiving relationship among WAN DL, WAN UL, and D2D by turning on/off the separate RF chain according to scheme 1, scheme 2, scheme 3, and scheme 4, respectively under the synchronization network environment.

Figure 10A:
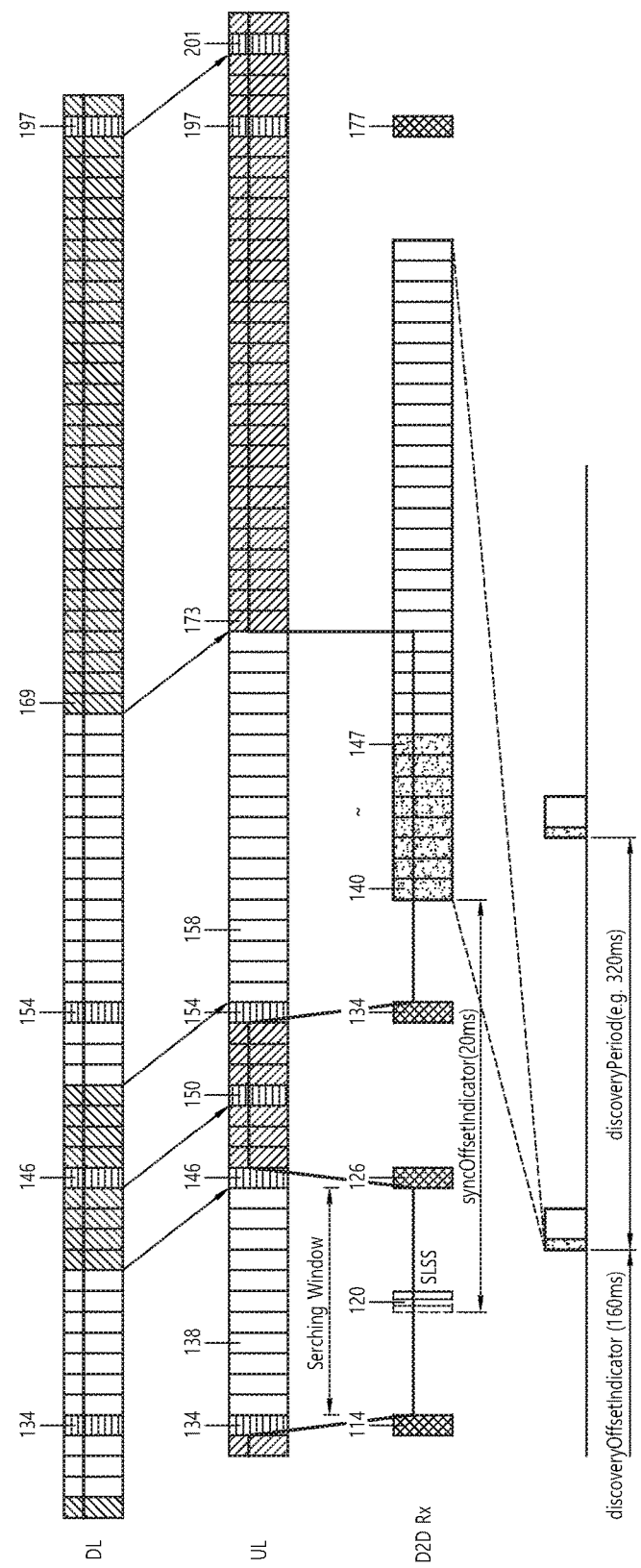
FIGS. 10A, 10B, 10C, and 10D illustrate the number of times to cause stopping WAN UL transmission the receiving relationship among WAN DL, WAN UL, and D2D by turning on/off the separate RF chain according to scheme 1, scheme 2, scheme 3, and scheme 4, respectively under the synchronization network environment.

Referring to FIG. 10A, it is expressed that subframes in which the separate RF chain for the D2D is turned on/off according to scheme 1 are DL subframes #134, #146, #154, and #197. In this case, the interruption occurs due to the turn-on/off of the separate RF chain for the D2D on UL ACK/NACK subframes #150 and #201 corresponding to DL subframes #146 and #197. All subframes in which the UL transmission is interrupted are subframes #134, #146, #150, #154, #197, and #201. In addition, the number of subframes in which the interruption occurs is 6 per 320 ms.

Figure 10B:
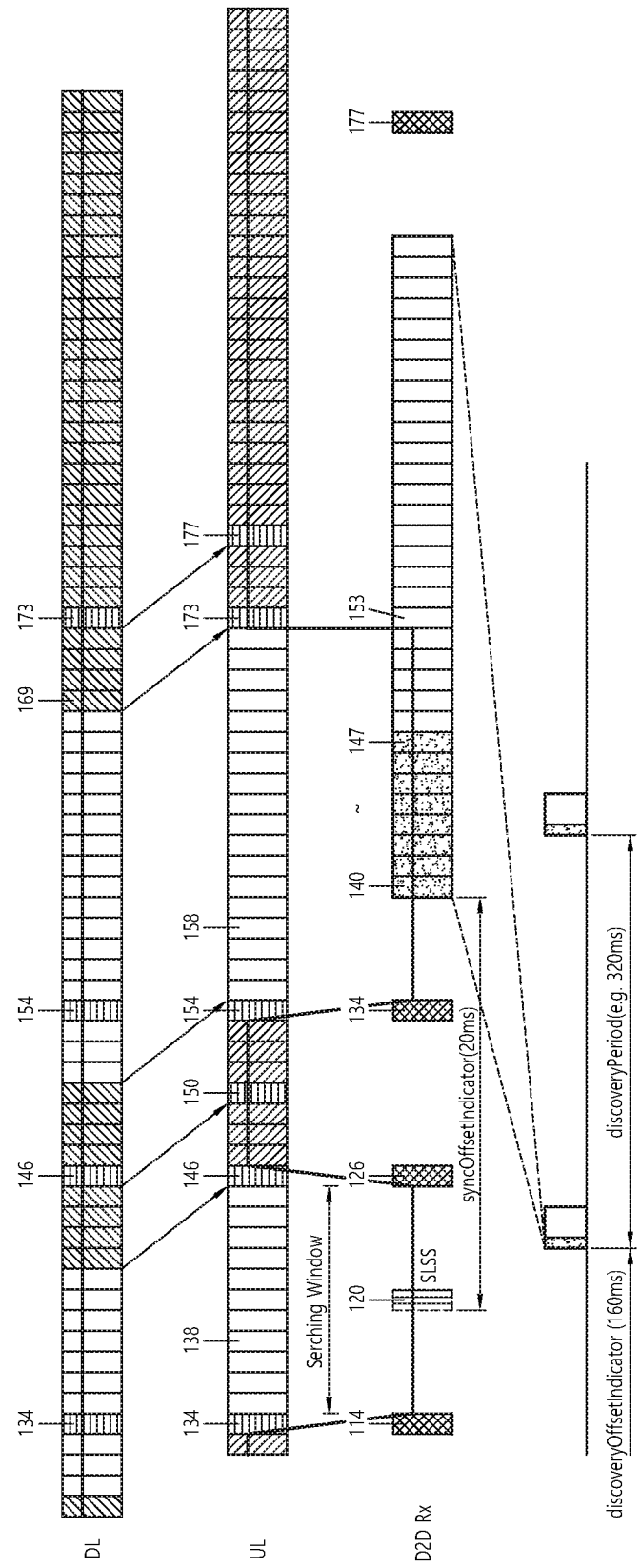

Referring to FIG. 10B, it is expressed that subframes in which the separate RF chain for the D2D is turned on/off according to scheme 2 are DL subframes #134, #146, #154, and #173. In this case, the interruption occurs due to the turn-on/off of the separate RF chain for the D2D on UL ACK/NACK subframes #150 and #177 corresponding to DL subframes #146 and #173. All subframes in which the UL transmission is interrupted are subframes #134, #146, #150, #154, #173, and #177. In addition, the number of subframes in which the interruption occurs is 6 per 320 ms. A difference from FIG. 10A is that on/off switching of the separate RF chain for the D2D communication is first performed as long as 24 subframes in FIG. 10B.

Figure 10C:
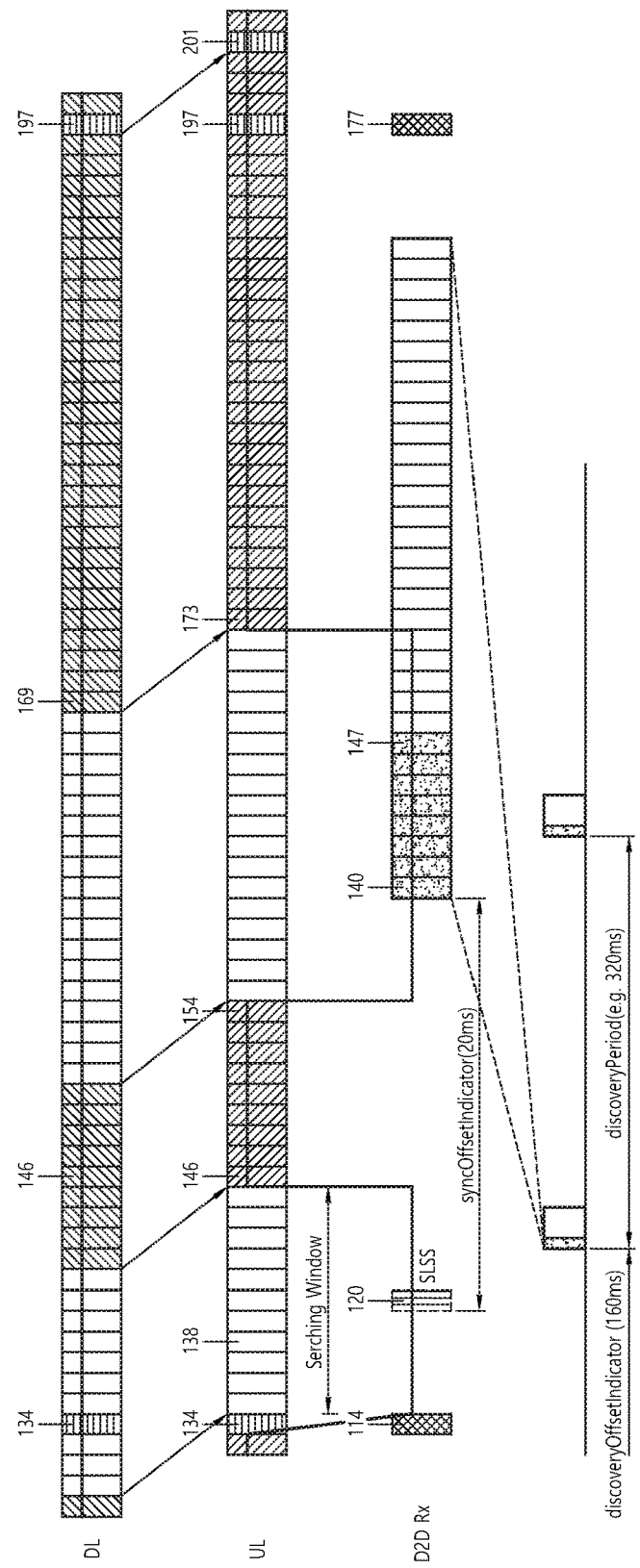

Referring to FIG. 10C, it is expressed that subframes in which the separate RF chain for the D2D is turned on/off according to scheme 3 are DL subframes #134 and #197. In this case, the interruption occurs due to the turn-on/off of the separate RF chain for the D2D on UL ACK/NACK subframe #201 corresponding to DL subframe #197. All subframes in which the UL transmission is interrupted are subframes #134, #197, and #201. In addition, the number of subframes in which the interruption occurs is 3 per 320 ms.

Figure 10D:
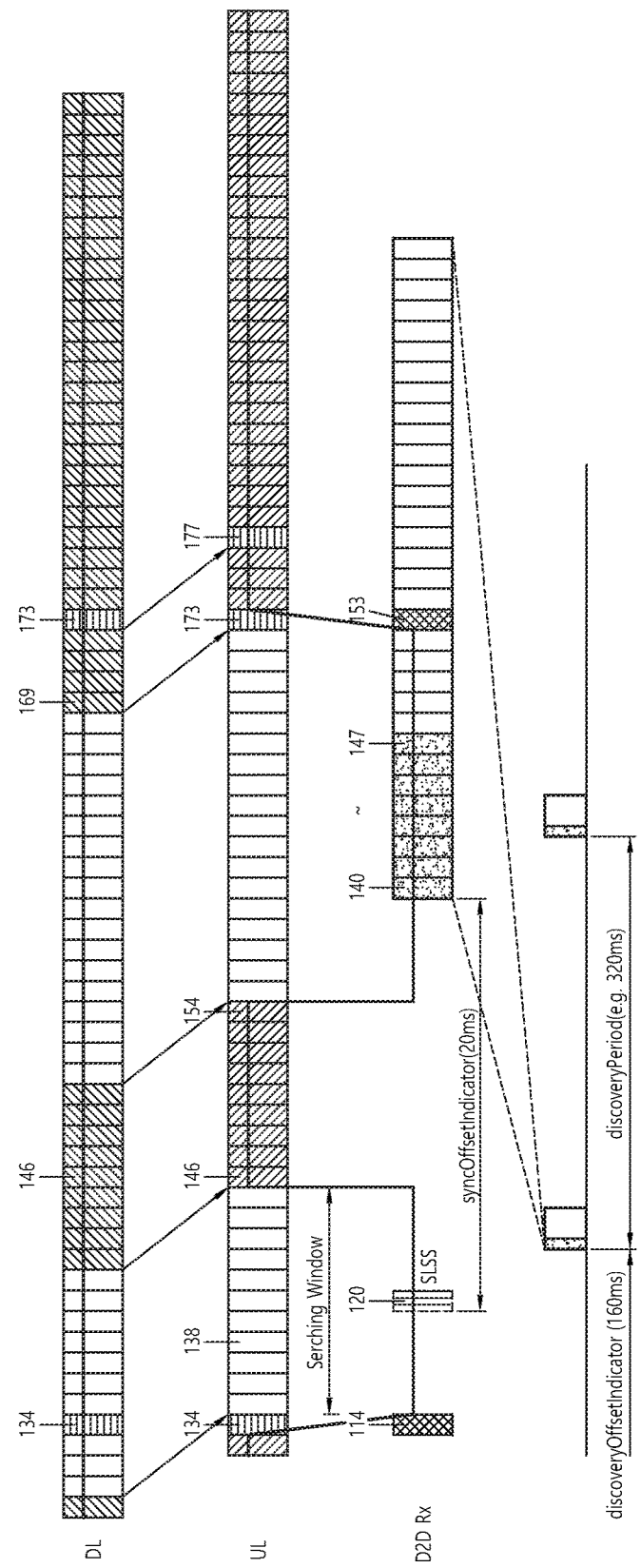

Referring to FIG. 10D, it is expressed that subframes in which the separate RF chain for the D2D is turned on/off according to scheme 4 are DL subframes #134 and #173. In this case, the interruption occurs due to the turn-on/off of the separate RF chain for the D2D on UL ACK/NACK subframe #177 corresponding to DL subframe #173. All subframes in which the UL transmission is interrupted are subframes #134, #173, and #177. In addition, the number of subframes in which the interruption occurs is 3 per 320 ms. The on/off switching of the separate RF chain for the D2D communication is first performed as long as 24 subframes in FIG. 10D.

FIGS. 11A, 11B, 11C, and 11D illustrate the number of times to cause stopping WAN UL transmission the receiving relationship among WAN DL, WAN UL, and D2D by turning on/off the separate RF chain according to scheme 1, scheme 2, scheme 3, and scheme 4, respectively under the synchronization network environment.

Figure 11A:
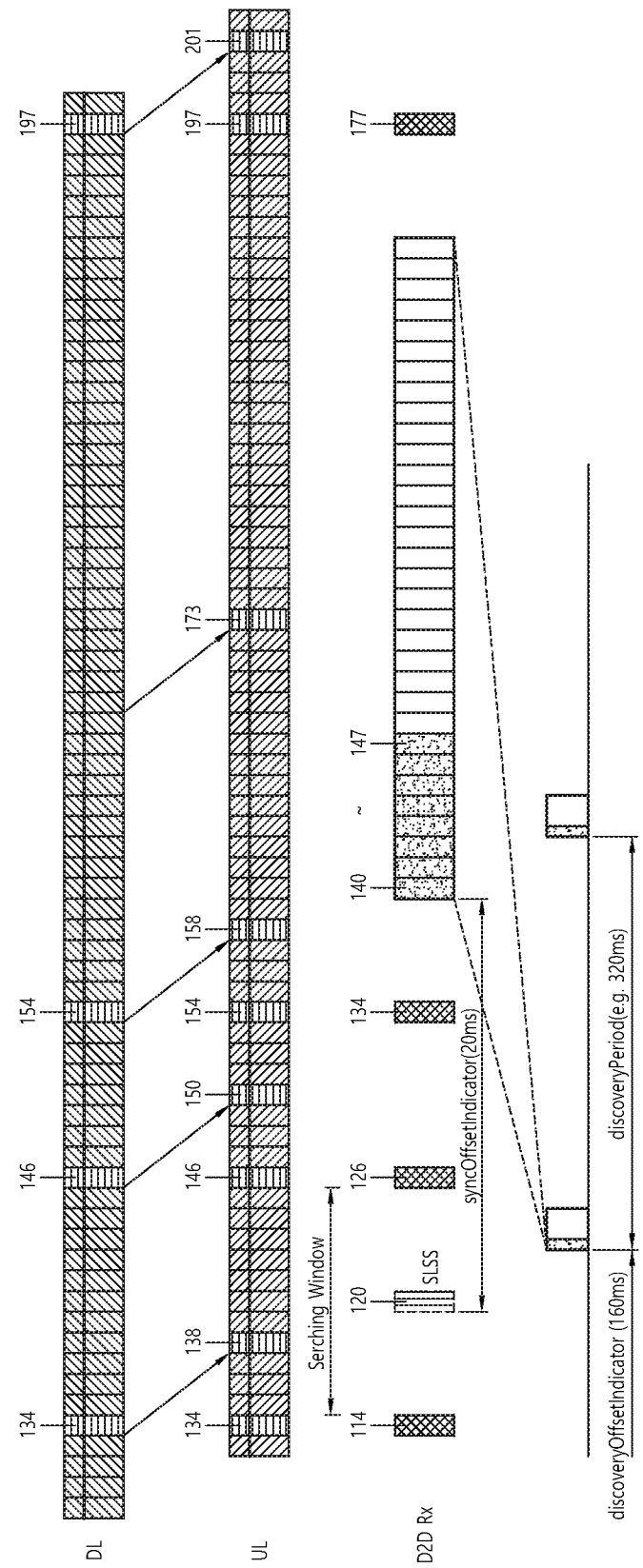
Figure 11B:
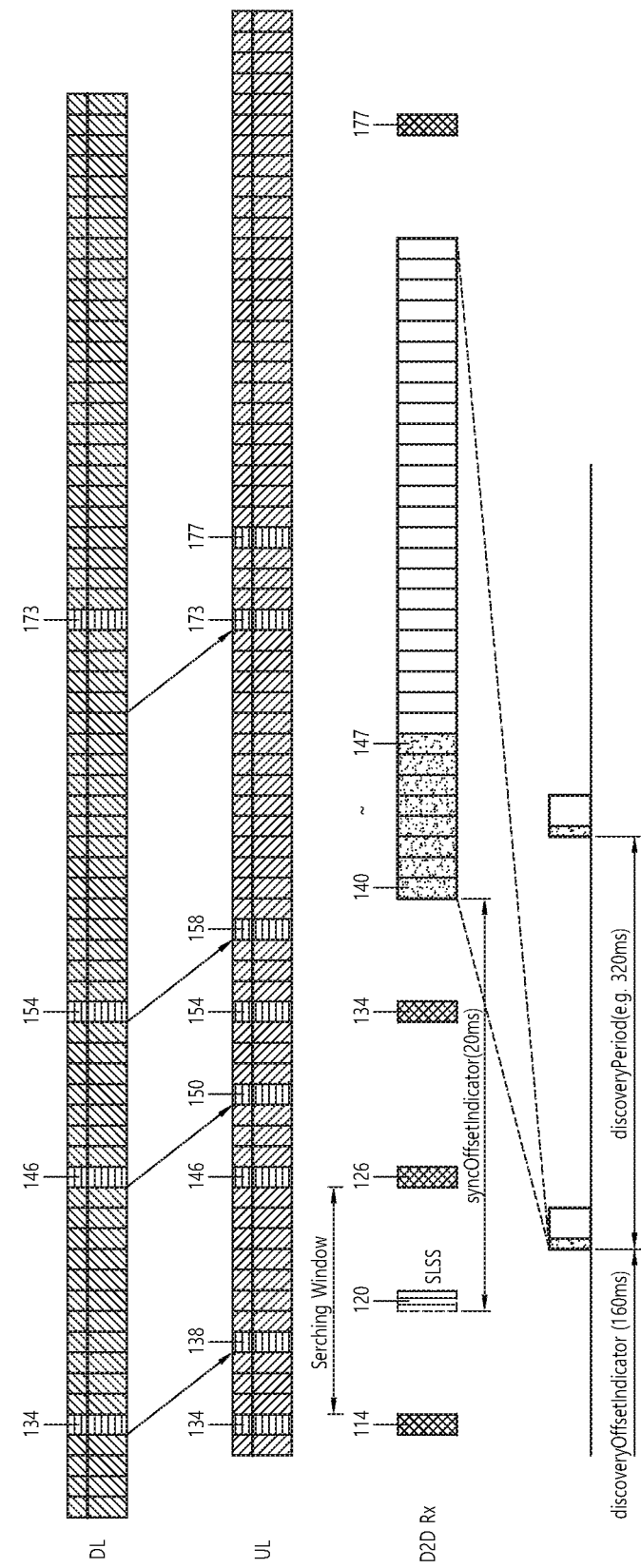
Figure 11C:
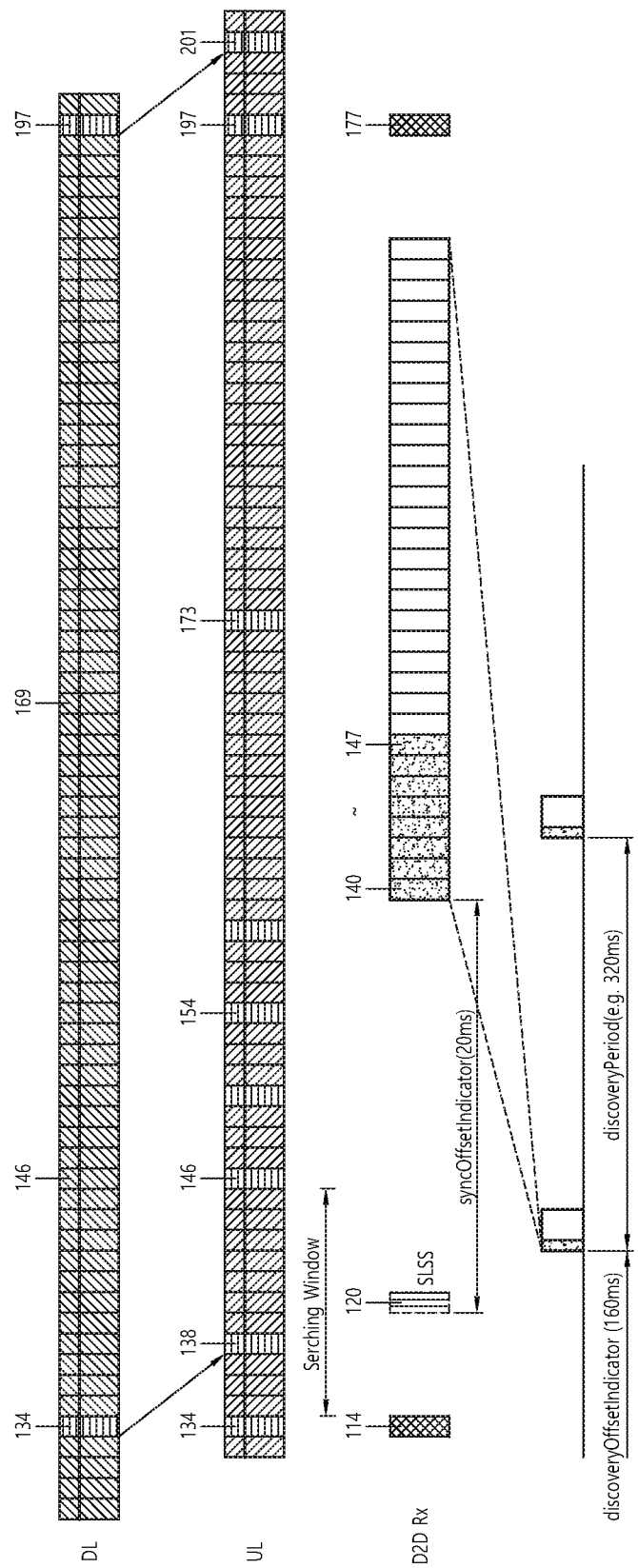

Referring to FIGS. 11A and 11B, the number of transmitted ACK/NACKs which the UE loses is 8 and referring to FIGS. 11C and 11D, the number of transmitted ACK/NACKs which the UE loses is 4.

In addition, referring to FIG. 11D, it is advantageous in terms of reducing the power consumption of the UE in that the switching of the separate RF chain is first performed as long as 24 subframes as compared with FIG. 11C.

This is organized by a table given below. Referring to a table given below, the number of subframes in which the transmission loss of the ACK/NACK and the power consumption are reduced according to the on/off subframe of the separate RF chain is shown.

III-1. Proposal According to Simulation Result

Proposal 1: Parameters given below may be considered in order to simulate the interruption of the WAN communication by the discovery in the D2D communication.

discoverySubframeBitmap=11111111_00000000_00000000_00000000
numRepetition=1
discoveryOffsetIndicator=160 ms
discovery period=320 ms
SyncOffsetIndicator=20 ms (for only Asynchronous network)
PDSCH scheduling in DL Further, options given below may be considered.

Optional 1: It is assumed that the base station does not schedule the PDSCH in the DL subframe associated with a UL ACK/NACK subframe corresponding to the discovery, which includes the SLSS and the searching window.

Optional 2: It is assumed that the base station schedules the PDSCH on all DL subframes.

In the synchronous network environment, the timing of turning on/off the separate RF chain for the D2D communication for the simulation may include schemes 1 and 2 as described below.

Scheme 1: Turning on/off the separate RF chain for the D2D communication before and after "discoverySubframeBitmap×numRepetition"

TABLE 13

| | PDSCH scheduling | | | | | | | |
|---|---|---|---|---|---|---|---|---|
| | Option 1 | | | | Option 2 | | | |
| | On/off switching scheme of separate RF chain | | | | | | | |
| | Scheme 1 | Scheme 2 | Scheme 3 | Scheme 4 | Scheme 1 | Scheme 2 | Scheme 3 | Scheme 4 |
| The number of Ack/Nacks lost | 6 | 6 | 3 | 3 | 8 | 8 | 4 | 4 |
| PDSCH scheduling | 291 | 291 | 291 | 291 | 320 | 320 | 320 | 320 |
| Loss rate (%) of Ack/Nack | 2.06 | 2.06 | 1.03 | 1.03 | 2.5 | 2.5 | 1.25 | 1.25 |
| The number of subframes in which the separate RF chain is turned on for D2D reception | 55 | 31 | 63 | 39 | 55 | 31 | 63 | 39 |

III. Organization of Simulation Result

The simulation results may be organized as below.

Organization 1: In the synchronous network, the number of all PDSCH schedulings in scheme 1 is smaller than that in scheme 2 by 10 for 320 ms. However, a difference in the transmission loss rate between the ACK/NACK is very small similarly in schemes 1 and 2.

Organization 2: In the synchronous network, the power consumption in scheme 1 may be further reduced than compared with scheme 2.

Organization 3: In the asynchronous network, the number of all PDSCH schedulings in scheme 1 is smaller than that in scheme 2 by 29 for 320 ms. However, the difference in the transmission loss rate between the ACK/NACK is very small similarly in schemes 1 and 2.

Organization 4: In the asynchronous network, the power consumption in schemes 2 and 4 may be further reduced than compared with schemes 1 and 3.

Organization 5: When the number of RF chains is one, the transmission loss of the ACK/NACK may be 0 in the synchronous network and the asynchronous network.

Based on the organizations, the present specification makes following proposals.

Scheme 2: Turning on/off the separate RF chain for the D2D communication before a subframe corresponding to first 1 of discoverySubframeBitmap and after a subframe corresponding to last 1 of discoverySubframeBitmap in "discoverySubframeBitmap×numRepetition"

Herein, scheme 2 is more efficient than scheme 1 in terms of reducing the power consumption.

On the contrary, in the asynchronous network environment, the timing of turning on/off the separate RF chain for the D2D communication for the simulation may include schemes 1, 2, 3, and 4 as described below.

Scheme 1: Turning on/off the separate RF chain for the D2D communication before and after "SLSS" and before and after "discoverySubframeBitmap×numRepetition"

Scheme 2: Turning on/off the separate RF chain for the D2D communication before and after "SLSS" and before a subframe corresponding to first 1 of discoverySubframeBitmap and after a subframe corresponding to last 1 of discoverySubframeBitmap in "discoverySubframeBitmap×numRepetition"

Scheme 3: Turning on/off the separate RF chain for the D2D communication before "SLSS" and after "discoverySubframeBitmap×numRepetition"

Scheme 4: Turning on/off the separate RF chain for the D2D communication before "SLSS" and after the subframe corresponding to last 1 of discoverySubframeBitmap in "discoverySubframeBitmap×numRepetition"

In the asynchronous network environment, scheme 4 is efficient in terms of reducing the power consumption among schemes 1, 2, 3, and 4 given above. Further, the case of scheme 2 is more efficient in terms of reducing the power consumption, but causes more interruption in the WAN communication and if the increased interruption is not significantly problematic, scheme 2 may also be effective.

Proposal 2: When the UE has one RF chain, the transmission lost of the ACK/NACK is 0.

Proposal 3: When the UE has one RF chain, the WAN communication is not interrupted, and as a result, this proposal need not be considered.

On the other hand, the following proposals may be made in terms of PDSCH scheduling.

In order to support an actual D2D operation, it is proposed that the base station does not assign a UL resource for the WAN communication of the D2D UE during a subframe (in the case of the asynchronous network environment: ceil (w1/1 ms) and in the case of the synchronous network environment: ceil (w2/1 ms)) corresponding to the D2D resource pool and the SLSS, and the D2D searching window) and when the WAN UL corresponds to the ACK/NACK of the WAN DL during the period, the base station does not assign even the WAN DL resource.

It is proposed that when UE#1 in a first cell transmits the D2D signal, the UE#1 does not assign the WAL UL resource to the subframe corresponding to the transmission D2D pool and when the WAN UL corresponds to ACK/NACK transmission, UE#1 does not assign even the associated WAN DL resource. In this case, it is proposed that in the case where a second cell supports the D2D and UE#2 in the second cell receives the D2D signal, two cells synchronize and asynchronize with each other, the base station of the second cell proposes that the WAN UL/DL resource assignment for the UE#2 including the searching window is restricted.

In the case of the synchronous network environment: The second cell does not assign the UL resource to the UE#2 during the searching window corresponding to ceil (w2/1 ms).

In the case of the asynchronous network environment: The second cell does not assign the UL resource to the UE#2 during the searching window corresponding to ceil (w1/1 ms).

The above searching window is present before and after the D2D resource pool and before and after the SLSS.

The UE having the D2D dedicated separate RF chain performs the operation of turning on/off the separate RF chain for the D2D. Changing the separate RF chain for the D2D from D2D Rx generated between on and off to WAN Tx and changing the separate RF chain for the D2D from the WAN Tx to the D2D Rx are performed similarly to the TDD operation. After turning on the separate RF chain for the D2D, the D2D timing is discovered by using signaled w1 and w2.

In the case of an inter-cell asynchronous network environment: When w1(5 ms) is applied, the D2D SLSS is defined in an 'n' subframe, and the D2D resource pool is defined in an 'm' subframe (n+0≤m≤n+39), the D2D RF chain is turned on in a subframe before SLSS 5 ms, that is, 'n−6' and the D2D RF chain is turned off in 'm+6'.

In the case of an inter-cell synchronous network environment: When w2(CP/2) is applied and the D2D resource pool is defined in 'n', the D2D RF chain is turned on in 'n−2' and turned off in 'n+2'. However, in this case, when short CP/2 is considered, it is proposed that each of the turn-on and off of the D2D RF chain is performed in 'n−1' and 'n+1' subframes and the following modification is proposed in contents of a standard TS36.133 associated therewith.

In this case, it is proposed that the searching window is 0 subframe.

Before and after the UL subframe configured for ProSe direct discovery, communication interruption of the UE is permitted from N subframes up to 1 subframe.

When a value of the discSyncWindow parameter is set to 2, the value of the N may be the number corresponding to the ceil(w1/1 ms) subframe. Otherwise, the value of the N which is 1 in the related art needs to be changed to 0.

This is applied to scheme 2 in the synchronous network environment as below.

In detail, when a first subframe corresponding to '1' is 'k' and a last subframe is 'p' in 'discoverySubframeBitmap× numRepetition' configuring the discovery resource pool, the separate chain for the D2D is turned on in 'k−2' and the separate chain for the D2D is turned off in 'p+2'. When the searching window is 0 subframe, the separate chain for the D2D is turned on in 'k−1' and turned off in 'p+1'.

Moreover, this is applied to schemes 4 and 2 in the asynchronous network environment as below.

In detail, according to scheme 4, when a first subframe corresponding to '1' is 'k' and a last subframe is 'p' in 'discoverySubframeBitmap×numRepetition' configuring the discovery resource pool, the separate chain for the D2D is turned on in 'n−6' and the separate chain for the D2D is turned off in 'p+6'.

In detail, according to scheme 2, when a first subframe corresponding to '1' is 'k' and a last subframe is 'p' in 'discoverySubframeBitmap×numRepetition' configuring the discovery resource pool, In the case of 12+R<k−n≤39: The separate RF chain for the D2D is turned on in 'n−6', turned off in 'n+6', turned on in 'k−6', and turned off in 'p+6'. Herein, R may be defined as a threshold at which actual power is saved.

In the case of 0≤k−n≤12+R: The separate RF chain for the D2D is turned on in 'n−6' and turned off in 'p+6'.

On the contrary, in the case of numRepetition ≥2, when a last subframe corresponding to '1' in s-th 'discoverySubframeBitmap' is 'u' and a first subframe corresponding to '1' in s+1-th 'discoverySubframeBitmap' is 'v', In the case of 12+R<v-u: The separate RF chain for the D2D is turned off in 'u+6' and turned off in 'v−6'. Herein, R may be defined as a threshold at which the actual power is saved.

In the case of 0≤v−u≤12+R: The separate RF chain for the D2D is maintained in the turn-on state.

The embodiments of the present invention described up to now may be implemented through various means. For example, the embodiments of the present invention may be implemented by hardware, firmware, software, or combinations thereof. In detail, the embodiments will be described with reference to a drawing.

Figure 12:
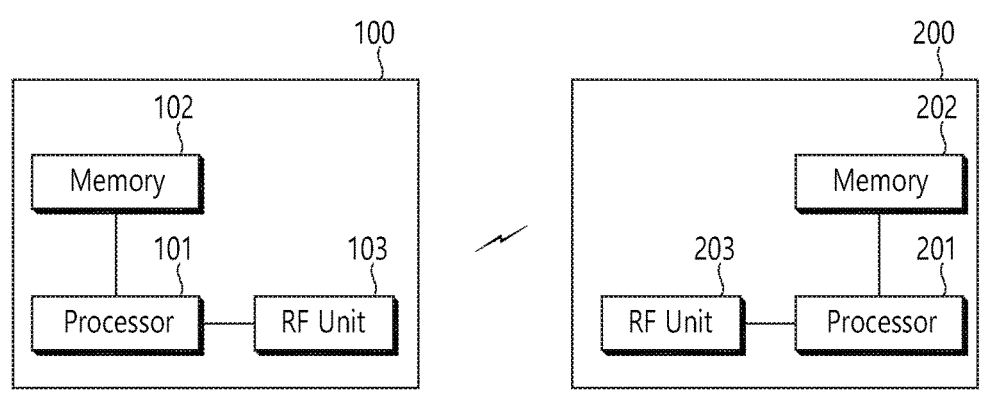
FIG. 12 is a block diagram illustrating a wireless communication system in which a disclosure of the present specification is implemented.

FIG. 12 is a block diagram illustrating a wireless communication system in which a disclosure of the present specification is implemented.

A base station 200 includes a processor 201, a memory 202, and a radio frequency (RF) unit 203. The memory 202 is connected with the processor 201 to store various information for driving the processor 201. The RF unit 203 is connected with the processor 201 to transmit and/or receive a radio signal. The processor 201 implements a function, a process, and/or a method which are proposed. In the aforementioned embodiment, an operation of the base station may be implemented by the processor 201.

A UE 100 includes a processor 101, a memory 102, and an RF unit 103. The memory 102 is connected with the processor 101 to store various information for driving the processor 101. The RF unit 103 is connected with the processor 101 to transmit and/or receive the radio signal. The processor 101 implements a function, a process, and/or a method which are proposed.

The processor may include an application-specific integrated circuit (ASIC), other chipset, a logic circuit, and/or a data processing device. The memory may include a read-only memory (ROM), a random access memory (RAM), a flash memory, a memory card, a storage medium, and/or another storage device. The RF unit may include a baseband circuit for processing the radio signal. When the embodiment is implemented by software, the aforementioned technique may be implemented by the module (a process, a function, and the like) performing the aforementioned function. The modules may be stored in the memory and executed by the processor. The memory may be positioned inside or outside the processor and connected with the processor through various well-known means.

In the aforementioned illustrated system, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

What is claimed is:

1. A transmitting/receiving method performed by a user equipment (UE) including a dedicated radio frequency (RF) chain for a proximity service (ProSe), the method comprising:
    receiving configuration information for a discovery resource pool, the discovery resource pool including a bitmap representing a subframe used for a discovery signal and information representing the number of times when the bitmap is repeated;
    turning on the dedicated RF chain based on a subframe corresponding to a first bit 1 in a bit string enumerated by the bitmap and the number of repetition times;
    after turning on the dedicated RF chain, transmitting/receiving a signal to/from an adjacent UE; and
    turning off the dedicated RF chain based on a subframe corresponding to a last bit 1 in the bit string,
    wherein the dedicated RF chain is maintained as a turn on state from the subframe corresponding to the first bit 1 in the bit string to the subframe corresponding to the last bit 1 in the bit string.

2. The method of claim 1, wherein:
    when the subframe corresponding to the first bit 1 is a $k^{th}$ subframe in the bit string and the subframe corresponding to the last bit 1 is a $p^{th}$ subframe in the bit string, the dedicated RF chain is turned on in a $(k-2)^{th}$ subframe and turned off in a $(p+2)^{th}$ subframe,
    wherein k is greater than or equal to 2, and p is greater than or equal to k.

3. The method of claim 1, wherein:
    when the subframe corresponding to the first bit 1 is the $k^{th}$ subframe in the bit string and the subframe corresponding to the last bit 1 is the $p^{th}$ subframe in the bit string,
    the dedicated RF chain is turned on in a $(k-1)^{th}$ subframe and turned off in a $(p+1)^{th}$ subframe,
    wherein k is greater than or equal to 1, and p is greater than or equal to k.

4. A transmitting/receiving method performed by a user equipment (UE) including a dedicated radio frequency (RF) chain for a proximity service (ProSe), the method comprising:
    receiving configuration information for a sidelink synchronization signal (SLSS), the configuration information includes information on a window for receiving the SLSS;
    receiving configuration information for a discovery resource pool, the discovery resource pool including a bitmap representing a subframe used for a discovery signal and information representing the number of times when the bitmap is repeated;
    turning on the dedicated RF chain in a subframe before the window for receiving the SLSS; and
    after turning on the dedicated RF chain, transmitting/receiving a signal to/from an adjacent UE; and
    turning off the dedicated RF chain based on a subframe corresponding to a last bit 1 in a bit string enumerated by the bitmap and the number of repetition times.

5. The method of claim 4, wherein:
    when the SLSS is received in an $n^{th}$ subframe in the bit string and the subframe corresponding to the last bit 1 is a $p^{th}$ subframe in the bit string,
    the dedicated RF chain is turned on in an $(n-6)^{th}$ subframe and turned off in a $(p+6)^{th}$ subframe,
    wherein n is greater than or equal to 6, and p is greater than or equal to n.

6. A user equipment (UE) comprising:
    a radio frequency (RF) chain receiving configuration information for a discovery resource pool, the discovery resource pool including a bitmap representing a subframe used for a discovery signal and information representing the number of times when the bitmap is repeated;
    a dedicated RF chain for a proximity service (ProSe); and
    a processor controlling the RF chain and the dedicated RF chain,
    wherein the processor:
        turns on the dedicated RF chain based on a subframe corresponding to a first bit 1 in a bit string enumerated by the bitmap and the number of repetition times;
        after turning on the dedicated RF chain, transmits/receives a signal to/from an adjacent UE; and
        turns off the dedicated RF chain based on a subframe corresponding to a last bit 1 in the bit string, and
    wherein the dedicated RF chain is maintained as a turn on state from the subframe corresponding to the first bit 1 in the bit string to the subframe corresponding to the last bit 1 in the bit string.

7. The user equipment of claim 6, wherein:
    when the subframe corresponding to the first bit 1 is the $k^{th}$ subframe in the bit string and the subframe corresponding to the last bit 1 is the $p^{th}$ subframe in the bit string,
    the dedicated RF chain is turned on in a $(k-2)^{th}$ subframe and turned off in a $(p+2)^{th}$ subframe,
    in k is greater than or equal to 2, and p is greater than or equal to k.

8. The user equipment of claim 6, wherein:
when the subframe corresponding to the first bit 1 is the $k^{th}$ subframe in the bit string and the subframe corresponding to the last bit 1 is the $p^{th}$ subframe in the bit string,
the dedicated RF chain is turned on in a $(k-1)^{th}$ subframe and turned off in a $(p+1)^{th}$ subframe,
wherein k is greater than or equal to 1, and p is greater than or equal to k.

* * * * *